United States Patent
Møgedal

(10) Patent No.: US 9,410,396 B2
(45) Date of Patent: Aug. 9, 2016

(54) GATE VALVE

(75) Inventor: Øystein Møgedal, Borgen (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 14/128,755

(22) PCT Filed: Jun. 28, 2012

(86) PCT No.: PCT/NO2012/050125
§ 371 (c)(1),
(2), (4) Date: Dec. 23, 2013

(87) PCT Pub. No.: WO2013/006062
PCT Pub. Date: Jan. 10, 2013

(65) Prior Publication Data
US 2014/0124209 A1    May 8, 2014

(30) Foreign Application Priority Data

Jul. 1, 2011 (NO) .................................. 20110958

(51) Int. Cl.
*E21B 7/12* (2006.01)
*E21B 34/04* (2006.01)
*F16K 3/02* (2006.01)

(52) U.S. Cl.
CPC ............... *E21B 34/04* (2013.01); *F16K 3/0263* (2013.01)

(58) Field of Classification Search
CPC .................................................. E21B 33/0375
See application file for complete search history.

(56) References Cited

U.S. PATENT DOCUMENTS

| 4,471,943 | A | 9/1984 | Nelson | |
|---|---|---|---|---|
| 4,971,101 | A | 11/1990 | Becker et al. | |
| 5,762,089 | A * | 6/1998 | Haeberle et al. | 251/326 |
| 6,260,822 | B1 * | 7/2001 | Puranik | 251/328 |
| 6,454,015 | B1 * | 9/2002 | Armstrong et al. | 166/387 |
| 8,070,131 | B2 * | 12/2011 | Liew | 251/326 |
| 8,146,889 | B2 * | 4/2012 | Hunter | 251/326 |
| 2009/0289209 | A1 * | 11/2009 | Comeaux et al. | 251/359 |
| 2013/0087733 | A1 * | 4/2013 | Rolland | 251/326 |

FOREIGN PATENT DOCUMENTS

| CN | 2793468 Y | 7/2006 |
|---|---|---|
| CN | 201462020 U | 5/2010 |

OTHER PUBLICATIONS

Beyond Valves, Oct. 14, 2009, http://www.valvemagazine.com/index.php/magazine/sections/beyond-valves/4379-todays-coatings-provide-solid-protection-for-valves.*
Bråten, Knut, International Search Report, prepared for PCT/NO2012/050125, as mailed Sep. 25, 2012, 3 pages.

* cited by examiner

*Primary Examiner* — Matthew R Buck
*Assistant Examiner* — Aaron Lembo
(74) *Attorney, Agent, or Firm* — Winstead PC

(57) ABSTRACT

The invention provides a gate valve for control of production of petroleum, distinctive in that the valve comprises a coating or hard facing on the internal bore surface exposed to flow of petroleum and associated fluids and solids.

5 Claims, No Drawings

GATE VALVE

FIELD OF THE INVENTION

The invention relates to gate valves. More specifically, the invention relates to gate valves for control of petroleum production, particularly subsea located gate valves for control of petroleum production.

BACKGROUND OF THE INVENTION AND PRIOR ART

Gate valves are used in the oil and gas industry. In some situations they can be used in conditions where the fluid may contain particles. A fluid with particles can cause erosion of the gate and seats of the valves during operation and cause damage to and failure of the valve. For prevention of sticking and galling in said gate valves, a coating of tungsten carbide or a hard-facing is typically applied on surfaces subject to sliding in operation.

A prejudice exist against coating further surfaces in a gate valve because further coating is considered to be superfluous since it is not assumed to have any effect. More specifically, other parts of the valve are assumed to have no benefit of coating and are assumed to have a service life as long as the rest of the components or elements of a subsea production system. Or in other words; only surfaces subject to sliding action during operation are considered to have a requirement for coating or hard-facing, not non-sliding surfaces like the internal flow bore of a gate valve.

However, testing has revealed that gate valves can fail far earlier than expected.

The objective of the invention is to provide a gate valve having improved service life and operational characteristics over prior art gate valves.

SUMMARY OF THE INVENTION

The invention provides a gate valve for control of production of petroleum, distinctive in that the valve comprises a coating or hard facing on the internal bore surface exposed to flow of petroleum and associated fluids and solids.

A coating, preferably a hard coating or a hard-facing, arranged as prescribed on the surface of the flow bore, has surprisingly been found to improve the service life of the valve significantly.

Preferably, the coating is applied on the flow bore ID of the gate and/or seat.

Preferably, the coating is a tungsten carbide coating.

In another preferable embodiment, the coating is a diamond like carbon (DLC) coating.

Today most gate valves use a hard facing technique on the sealing surfaces between the gate and seats, which surfaces are subject to sliding during operation. However, when operating the valve with a high velocity flow passing through the valve the flow can erode away the softer base material under the coating on the sides of the internal bores and damage the seal surfaces. Applying a hardfacing technique or coating to those surfaces will make the valve much less prone to damage caused by erosion and/or cavitation.

It is previously known that particles in a fluid can cause erosion and also that erosion is more likely to happen on softer material than a hard material. The same is the effect of cavitation on a material. However, this has not been assumed to be relevant for the internal flow bore of a gate valve since the flow bore is straight and clean and has been considered to have a service life at least similar to that of a straight section of a pipe.

Surprisingly, the service life of the flow bore in industry standard gate valves is shorter than expected. A possible explanation, without wishing to be bound by theory, is that the flow pattern during open and closing, particularly at very small openings and high differential pressures, is turbulent and promotes cavitation. When the gate is opening, and closing, the rapid changes in pressure can cause cavitation on the valve parts, resulting in leakage, further damage and eventually total failure of the valve.

The result of the internal bore coating is that the valve is much less prone to both cavitation and erosion and the service life of the valve is prolonged. Frequent operation, with many open-close cycles, high pressure and small flow cross section areas at beginning and end of the open-close cycle, particularly when sand or other hard particles are a part of the flow, become a far less deteriorating operation modus.

If a subsea mounted valve is damaged during operation, the production has to stop and the equipment must be retrieved to the surface. This can potentially cost hundreds of millions kroner. With the present invention, the chance for problems with the equipment subsea is reduced significantly.

The valve shall be used in applications in the oil and gas industry.

To prevent damage, due to erosion and/or corrosion, coating and/or hard-facing of the internal bore of the gate and/or seats is undertaken. This can typically, but not limited, be HVOF, HVAF or CVD techniques. Processes like plasma nitriding can also be used to create the hard layer required to prevent damage.

The invention provides a gate valve for control of production of petroleum, distinctive in that the valve comprises a coating or hard-facing for protection against erosion and cavitation on the flow bore ID of the gate and/or seat exposed to flow of petroleum and associated fluids and solids. Preferably, the gate valve is a subsea gate valve on or connected to a subsea hydrocarbon production tree.

The invention claimed is:
1. A gate valve comprising:
 a gate disposed in a seat, the gate having a first internal surface and the seat having a second internal surface, the first internal surface and the second internal surface defining a bore through the gate and the seat;
 a tungsten carbide hard surface applied to an entirety of the first internal surface and an entirety of the second internal surface such that the tungsten carbide hard surface is exposed to flow of petroleum and associated fluids and solids; and
 wherein the tungsten carbide hard surface applied to the entirety of the first internal surface and the entirety of the second internal surface protects the first internal surface and the second internal surface against at least one of erosion and cavitation during at least one of opening and closing of the gate valve.

2. The gate valve of claim 1, wherein the tungsten carbide hard surface protects the first internal surface and the second internal surface against at least one of erosion and cavitation.

3. A method of protecting a gate valve, the method comprising:
 forming a hard surface on an entirety of an internal surface of a gate of the gate valve and an entirety of an internal surface of a seat of the gate valve;
 protecting, via the hard surface, the internal surface of the gate and the internal surface of the seat against at least one of erosion and cavitation during at least one of opening and closing of the gate valve; and wherein the hard surface is exposed to flow of petroleum and associated fluids and solids after the hard surface is formed.

4. The method of claim 3, wherein the hard surface comprises diamond-like carbon ("DLC").

5. The method of claim 3, wherein the internal surface of the gate and the internal surface of the seat are protected against at least one of erosion and cavitation.

\* \* \* \* \*